J. Montgomery,
Steam-Boiler Water-Tube.
No. 122. Reissued Aug. 15, 1848.
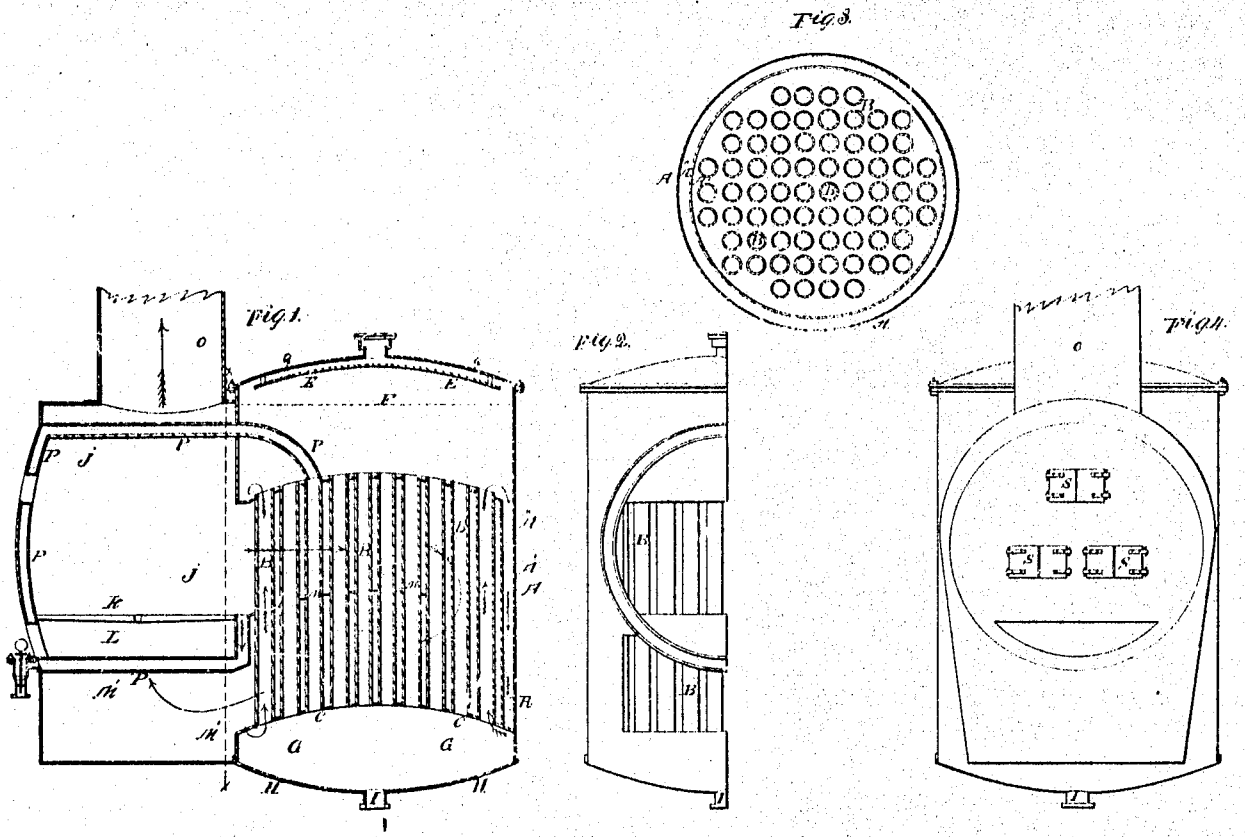
AM. PHOTO-LITHO. CO. N.Y. (SEMBRATS PROCESS)

United States Patent Office

PTO - BOYERS, PA Duty Station

MISSING PAGE TEMPORARY NOTICE

PATENT # Re 122 FOR ISSUE DATE 8-15-1848

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE

Text pages 1 & 2

Data Conversion Operation

Boyers, Pa

BEST AVAILABLE COPY scribed, when this is combined with the fire-chamber placed at the side of the boiler and outside of the series of tubes substantially as described, whereby the tubes are prevented from being overheated and unequally expanded to an injurious extent, and the water kept cooler in the jacket than in the series of tubes, as described.

2. In combination with vertical or nearly vertical tubes and surrounding water space or spaces, the employment of a fire-chamber outside of the series of tubes, and so arranged and located, substantially as described, as to apply the most intense heat at their upper ends and the reduced heat toward their lower ends, substantially as herein described, whereby a greater circulation and evaporation of water is obtained with a given amount of fuel than by any other plan known to me, thereby not only economizing fuel, but effectually preventing the incrustation of the tubes by the deposit of mineral and other solid matter, as described.

3. The employment of a diaphragm or partition in the flue-space between the series of tubes surrounded by the water space or spaces, and, in combination therewith to divide the same into two parts that the products of combustion after passing around the upper end of the tubes may pass around their lower ends, substantially as described, and thus more effectually expose the upper end of the tubes to more intense heat than their lower, as described.

4. The making of the bottom of the boiler of a conical or dished form, with a mud or blow-off valve in the lowest part of the concavity, in combination with the vertical tubes communicating with the bottom in the manner herein described, to permit the deposit of the sediment, there being a water-space surrounding them to induce circulation of the water up the tubes toward the mud or blow-off valve, as herein described.

JAS. MONTGOMERY.

Witnesses:
A. P. BROWNETT,
EDWARD A. PETERS.